(12) United States Patent
Spahr et al.

(10) Patent No.: US 7,115,221 B1
(45) Date of Patent: Oct. 3, 2006

(54) METHOD FOR PRODUCING GRAPHITE POWDER WITH AN INCREASED BULK DENSITY

(75) Inventors: Michael Spahr, Cham (CH); Davide Cattaneo, Arbedo (CH); Klaus Streb, Sins (CH)

(73) Assignee: Timcal AG, Bodio (CH)

( * ) Notice: Subject to any disclaimer, the term of this patent is extended or adjusted under 35 U.S.C. 154(b) by 564 days.

(21) Appl. No.: 10/130,261

(22) PCT Filed: Sep. 22, 2000

(86) PCT No.: PCT/CH00/00514

§ 371 (c)(1),
(2), (4) Date: Jul. 15, 2002

(87) PCT Pub. No.: WO01/38220

PCT Pub. Date: May 31, 2001

(30) Foreign Application Priority Data

Nov. 26, 1999 (CH) .................................... 2165/99

(51) Int. Cl.
- *C01B 31/04* (2006.01)
- *H01M 2/00* (2006.01)
- *H01M 2/02* (2006.01)
- *H01M 4/02* (2006.01)
- *H01M 8/02* (2006.01)

(52) U.S. Cl. ............................ 264/15; 429/12; 429/34; 429/209

(58) Field of Classification Search ............ 429/34–39; 148/513; 451/32–44; 241/27, 5, 277; 264/15, 264/162, 341

See application file for complete search history.

(56) References Cited

U.S. PATENT DOCUMENTS

| | | | |
|---|---|---|---|
| 3,333,841 A | 8/1967 | Olstowski | 71/39 |
| 3,553,527 A * | 1/1971 | Gutsche et al. | 219/137 WM |
| 3,626,149 A | 12/1971 | Carney et al. | 219/213 |
| 3,642,538 A | 2/1972 | Zito | 136/6 |
| 3,684,446 A | 8/1972 | Markel | 423/448 |
| 3,807,961 A | 4/1974 | Markel | 23/277 R |
| 3,852,113 A | 12/1974 | Yokota et al. | 136/83 R |
| 4,041,220 A | 8/1977 | Armand | 429/191 |
| 4,388,381 A | 6/1983 | Mennicke et al. | 429/104 |
| 4,409,073 A | 10/1983 | Goldberger | 204/67 |
| 4,419,455 A | 12/1983 | Shikeno et al. | 501/95 |
| 4,435,444 A | 3/1984 | Goldberger | 427/49 |

(Continued)

FOREIGN PATENT DOCUMENTS

CA 2246953 3/1998

(Continued)

OTHER PUBLICATIONS

Wang et al., "Effect of Milling on the Electrochemical Performance of Natural Graphite as an Anode Material for Lithium-Ion Battery", *Journal of Power Sources* 83 (1999) 141 to 147.

(Continued)

*Primary Examiner*—Patrick Joseph Ryan
*Assistant Examiner*—Melissa Austin
(74) *Attorney, Agent, or Firm*—Sughrue Mion, PLLC

(57) ABSTRACT

A method for increasing the Scott density of synthetic and/or natural graphite powders of any particle size distribution, preferably of highly-pure graphite, by subjecting the graphite powder to an autogenous surface treatment. The powder is used, in particular, for producing dispersions, coatings with an increased graphite/binder ratio and increased electric and thermal conductivity, gas and liquid-tight coatings on metal substrates, thermoplastic or duroplastic graphite-polymer composites, or for producing metallic, non-ferrous sintering materials.

40 Claims, 1 Drawing Sheet

U.S. PATENT DOCUMENTS

| | | | |
|---|---|---|---|
| 4,543,240 A | 9/1985 | Goldberger | 423/346 |
| 4,547,430 A | 10/1985 | Goldberger et al. | 428/404 |
| 4,560,409 A | 12/1985 | Goldberger et al. | 75/103 R |
| 4,634,545 A | 1/1987 | Zaleski et al. | 252/29 |
| 4,863,818 A | 9/1989 | Yoshimoto et al. | 429/218 |
| 4,895,713 A | 1/1990 | Greinke et al. | 423/448 |
| 5,082,296 A | 1/1992 | Aizawa et al. | 277/204 |
| 5,086,022 A | 2/1992 | Roca et al. | 502/60 |
| 5,094,780 A | 3/1992 | von Bonin | 252/606 |
| 5,103,609 A | 4/1992 | Thoreson et al. | 52/232 |
| 5,118,576 A | 6/1992 | Imae et al. | 428/408 |
| 5,134,030 A | 7/1992 | Ueda et al. | 428/365 |
| 5,149,055 A | 9/1992 | Huber et al. | 251/324 |
| 5,149,518 A | 9/1992 | Mercuri et al. | 423/449 |
| 5,169,876 A | 12/1992 | Heitmann et al. | 521/155 |
| 5,180,459 A | 1/1993 | Bauer et al. | 156/89 |
| 5,183,273 A | 2/1993 | Dennys et al. | 277/170 |
| 5,183,491 A | 2/1993 | D'Iribarne et al. | 65/351 |
| 5,188,376 A | 2/1993 | Ueda et al. | 277/227 |
| 5,192,811 A | 3/1993 | Heitmann et al. | 521/99 |
| 5,194,198 A | 3/1993 | von Bonin et al. | 264/42 |
| 5,221,575 A | 6/1993 | Nakano et al. | 428/323 |
| 5,222,744 A | 6/1993 | Dennys | 277/180 |
| 5,226,662 A | 7/1993 | Justus | 277/235 B |
| 5,246,638 A | 9/1993 | Goldberger | 264/27 |
| 5,270,902 A | 12/1993 | Bellar et al. | 361/718 |
| 5,282,975 A | 2/1994 | Maryasin et al. | 210/691 |
| 5,283,219 A | 2/1994 | Mauran et al. | 502/417 |
| 5,288,429 A | 2/1994 | von Bonin et al. | 252/378 R |
| 5,294,300 A | 3/1994 | Kusuyama et al. | 162/157.3 |
| 5,294,382 A | 3/1994 | Goldberger | 264/27 |
| 5,301,960 A | 4/1994 | Meyer et al. | 277/229 |
| 5,309,690 A | 5/1994 | Symons | 52/309.9 |
| 5,330,680 A | 7/1994 | Sakawaki et al. | 252/309 |
| 5,346,650 A | 9/1994 | Toda et al. | 252/506 |
| 5,348,694 A | 9/1994 | Goldberger | 264/27 |
| 5,362,074 A | 11/1994 | Gallo et al. | 277/233 |
| 5,370,405 A | 12/1994 | Ueda | 277/230 |
| 5,381,818 A | 1/1995 | Nendzig et al. | 137/242 |
| 5,382,387 A | 1/1995 | von Bonin | 252/602 |
| 5,395,469 A | 3/1995 | Suggs et al. | 156/173 |
| 5,397,643 A | 3/1995 | von Bonin et al. | 428/408 |
| 5,413,359 A | 5/1995 | Latty | 277/180 |
| 5,421,594 A | 6/1995 | Becerra | 277/213 |
| 5,431,831 A | 7/1995 | Vincent | 252/29 |
| 5,445,748 A | 8/1995 | Holinski | 252/30 |
| 5,452,904 A | 9/1995 | Huber et al. | 277/123 |
| 5,454,397 A | 10/1995 | Miszczak | 137/512 |
| 5,468,003 A | 11/1995 | Staab et al. | 277/235 |
| 5,482,798 A | 1/1996 | Mototani et al. | 429/224 |
| 5,499,825 A | 3/1996 | Maeda et al. | 277/100 |
| 5,501,582 A | 3/1996 | Gautier et al. | 417/420 |
| 5,503,717 A | 4/1996 | Kang et al. | 205/478 |
| 5,509,993 A | 4/1996 | Hirschvogel | 156/326 |
| 5,518,189 A | 5/1996 | Grondin et al. | 241/20 |
| 5,518,519 A | 5/1996 | Kondoh et al. | 75/231 |
| 5,522,603 A | 6/1996 | Naitou et al. | 277/102 |
| 5,531,454 A | 7/1996 | Borneby | 277/26 |
| 5,540,277 A | 7/1996 | Gourlia et al. | 165/164 |
| 5,544,898 A | 8/1996 | Nendzig et al. | 277/166 |
| 5,549,306 A | 8/1996 | Ueda | 277/229 |
| 5,554,348 A | 9/1996 | Bauer | 422/211 |
| 5,560,892 A | 10/1996 | Bennett et al. | 422/267 |
| 5,569,534 A | 10/1996 | Lambotte et al. | 428/402 |
| 5,570,501 A | 11/1996 | Atkinson et al. | 29/527.2 |
| 5,573,253 A | 11/1996 | Naitou et al. | 277/1 |
| 5,582,781 A | 12/1996 | Hayward | 264/28 |
| 5,605,341 A | 2/1997 | Ueda | 277/204 |
| 5,607,889 A | 3/1997 | Prosdocimi et al. | 502/80 |
| 5,612,272 A | 3/1997 | Prosdocimi et al. | 502/181 |
| 5,628,520 A | 5/1997 | Ueda et al. | 277/235 |
| 5,634,645 A | 6/1997 | Seki et al. | 277/227 |
| 5,656,794 A | 8/1997 | Krone et al. | 149/108.2 |
| 5,671,929 A | 9/1997 | Pflug | 277/233 |
| 5,672,327 A | 9/1997 | Bennett et al. | 423/448 |
| 5,683,281 A | 11/1997 | Metter | 442/179 |
| 5,683,778 A | 11/1997 | Crosier | 428/59 |
| 5,687,974 A | 11/1997 | Wilkinson et al. | 277/102 |
| 5,698,088 A | 12/1997 | Kang et al. | 205/555 |
| 5,706,165 A | 1/1998 | Saito et al. | 361/502 |
| 5,716,055 A | 2/1998 | Wilkinson et al. | 277/102 |
| 5,722,670 A | 3/1998 | Novak et al. | 277/235 A |
| 5,765,838 A | 6/1998 | Ueda et al. | 277/650 |
| 5,772,215 A | 6/1998 | West | 277/235 |
| 5,776,372 A | 7/1998 | Saito et al. | 252/511 |
| 5,786,555 A | 7/1998 | Saito et al. | 204/294 |
| 5,788,865 A | 8/1998 | Smirnov et al. | 210/690 |
| 5,795,518 A | 8/1998 | Parr | 264/134 |
| 5,803,464 A | 9/1998 | Ueda et al. | 277/528 |
| 5,820,788 A | 10/1998 | Smith | 252/511 |
| 5,824,923 A | 10/1998 | Kondoh et al. | 75/247 |
| 5,826,669 A | 10/1998 | Zaleski et al. | 175/72 |
| 5,842,350 A | 12/1998 | Spinner et al. | 62/86 |
| 5,856,398 A * | 1/1999 | Oizumi et al. | 524/496 |
| 5,858,486 A | 1/1999 | Metter et al. | 428/34.1 |
| 5,861,207 A | 1/1999 | Bou et al. | 428/312.2 |
| 5,876,042 A | 3/1999 | Graf et al. | 277/627 |
| 5,882,570 A * | 3/1999 | Hayward | 264/328.18 |
| RE36,206 E | 5/1999 | Borneby | 277/627 |
| 5,972,538 A | 10/1999 | Saito et al. | 429/245 |
| 5,976,727 A | 11/1999 | Mercuri et al. | 429/37 |
| 5,981,072 A | 11/1999 | Mercuri et al. | 428/408 |
| 6,030,913 A | 2/2000 | Heine et al. | 501/88 |
| 6,149,972 A | 11/2000 | Greinke | 427/220 |
| 6,169,059 B1 | 1/2001 | Skiles et al. | 508/115 |
| 6,194,358 B1 | 2/2001 | Lawrence et al. | 508/115 |
| 6,231,791 B1 | 5/2001 | Heine et al. | 264/29.5 |
| 6,258,457 B1 | 7/2001 | Ottinger et al. | 428/408 |
| 6,268,086 B1 | 7/2001 | Honbo et al. | 429/231.8 |
| 6,287,694 B1 | 9/2001 | Zaleski et al. | 428/402 |
| 6,350,722 B1 | 2/2002 | Skiles et al. | 508/115 |
| 6,372,376 B1 * | 4/2002 | Fronk et al. | 429/41 |
| 6,383,467 B1 | 5/2002 | Honbo et al. | 423/448 |
| 6,385,956 B1 | 5/2002 | Ottinger et al. | 57/200 |
| 6,406,612 B1 | 6/2002 | Greinke et al. | 205/555 |
| 6,413,663 B1 | 7/2002 | Mercuri | 429/30 |
| 6,416,815 B1 | 7/2002 | Greinke et al. | 427/220 |
| 6,494,926 B1 | 12/2002 | Saito et al. | 29/623.1 |
| 6,555,223 B1 | 4/2003 | Kubo | 428/408 |
| 6,558,782 B1 | 5/2003 | Bakman et al. | 428/293.4 |
| 6,620,359 B1 | 9/2003 | Meza et al. | 264/115 |
| 2001/0001096 A1 | 5/2001 | Skiles et al. | 508/115 |
| 2001/0046557 A1 | 11/2001 | Greinke et al. | 427/215 |
| 2002/0045100 A1 | 4/2002 | Honbo et al. | 429/231.8 |
| 2002/0109125 A1 | 8/2002 | Krassowski et al. | 252/500 |
| 2002/0141933 A1 | 10/2002 | Kubo | 423/448 |
| 2002/0168526 A1 | 11/2002 | Mercuri et al. | 428/408 |
| 2002/0172855 A1 | 11/2002 | Mercuri et al. | 429/44 |
| 2002/0197476 A1 | 12/2002 | Mercuri et al. | 428/408 |
| 2003/0113542 A1 | 6/2003 | Norley et al. | 428/408 |
| 2003/0116753 A1 | 6/2003 | Norley et al. | 252/500 |

FOREIGN PATENT DOCUMENTS

| | | | |
|---|---|---|---|
| CA | 2246953 | * | 9/1999 |
| DE | 1253130 | | 10/1967 |
| DE | 3505656 | | 8/1986 |
| DE | 3704537 | | 8/1988 |
| EP | 0044867 B1 | | 5/1985 |
| EP | 0085121 B1 | | 6/1985 |
| EP | 0228488 A1 | | 7/1987 |
| EP | 0274165 A1 | | 7/1988 |
| EP | 0305984 A2 | | 8/1988 |
| EP | 0375469 A2 | | 6/1990 |

| | | | |
|---|---|---|---|
| EP | 0375469 | A3 | 4/1991 |
| EP | 0432944 | A1 | 6/1991 |
| EP | 0228488 | B1 | 9/1991 |
| EP | 0274165 | B1 | 3/1992 |
| EP | 0557906 | A1 | 9/1993 |
| EP | 0596801 | A2 | 5/1994 |
| EP | 0675556 | A1 | 4/1995 |
| EP | 0375469 | B1 | 4/1996 |
| EP | 0784352 | A1 | 7/1997 |
| EP | 0998984 | A2 | 5/2000 |
| EP | 1094045 | A2 | 4/2001 |
| EP | 1120378 | A2 | 8/2001 |
| EP | 1120378 | A3 | 9/2001 |
| EP | 1213272 | A2 | 6/2002 |
| EP | 1221432 | A2 | 7/2002 |
| EP | 1213272 | A3 | 4/2003 |
| EP | 1221432 | A3 | 4/2003 |
| FR | 2677975 | | 12/1992 |
| JP | 58156515 | | 9/1983 |
| JP | 60166211 | | 8/1985 |
| JP | 06100727 | | 4/1994 |
| WO | WO8102292 | A1 | 8/1981 |
| WO | WO83001170 | A1 | 1/1983 |
| WO | WO9722677 | A2 | 6/1997 |
| WO | WO9901403 | | 10/1998 |
| WO | WO9845223 | | 1/1999 |
| WO | WO9946437 | A1 | 9/1999 |
| WO | WO0021151 | A1 | 4/2000 |
| WO | WO0179137 | A1 | 10/2001 |
| WO | WO0189992 | A1 | 11/2001 |
| WO | WO0211900 | A1 | 2/2002 |
| WO | WO0240807 | A2 | 5/2002 |
| WO | WO0244080 | A2 | 6/2002 |
| WO | WO02071508 | A2 | 9/2002 |
| WO | WO02083775 | A1 | 10/2002 |

OTHER PUBLICATIONS

Database WPI 199419, Derwent Publication Ltd., London GB; JP 06 100727, Apr. 12, 1994.
Patent Abstracts of Japan, vol. 014, No. 275 (C-0728), Jun. 14, 1990, JP 02 083205 A, Mar. 23, 1990.
Patent Abstracts of Japan, vol. 1997, No. 03, Mar. 31, 1997, JP 08 298117 A, Nov. 12, 1996.
Patent Abstracts of Japan, vol. 1996, No. 12, Dec. 26, 1996, JP 08 213020 A, Aug. 20, 1996.
Database WPI 199638, Derwent Publications Ltd., London, GB; RU 2 049552 C, Dec. 10, 1995.
Hongbo et al., Preliminary Study of the Preparation of Expanded Graphite Using Potassium Chlorate as an Oxidizing Agent, (1994), Chemical Abstract No. 121:233974.
Celzard et al., Surface Area of Compressed Expanded Graphite, Carbon, 40, (2002), 2713-2718.
Celzard et al., Composites Based On Micron-Sized Exfoliated Graphite Particles: Electrical Conduction, Critical Exponents And Anisotrophy, J. Phy. Chem Solids, vol. 57, Nos. 6-8 pp. 715-718, (2002).
Magasinski et al., Graphitization, Intercalation, and Exfoliation of Cokes and Anthracites: A Comparative Study, Fuel Process. Tech., 79, (2002), 259-264.
Petitjean et al., Exothermic Exfoliation of Graphite Intercalation Compounds Containing Perchloric Acid, Carbon, vol. 32, No. 3, pp. 461-467, (1994).
Klatt et al., Study of Exfoliation of Graphite-Sulfur Trioxide Intercalation Compounds, Carbon, vol. 24, No. 6, pp. 731-735, (1996).
Furdin, Exfoliation Process and Elaboration of New Carbonaceous Materials, Fuel, vol. 77, No. 6, pp. 479-485, (1998).
Alain et al., SEM Observations Of Mesphase Spherule Formation During The Pyrolysis Of Coal Tar Pitch In The Presence Of $FeCl_3$-Graphite, Carbon, vol. 34, No. 5, pp. 682-685, (1996).
Furdin et al., New Variety Of Natural Graphite Powder: Elaboration And Properties, Mol. Cryst. Liq. Cryst., vol. 245, pp. 219-223, (1994).
Petitjean et al., A New Data On Graphite Intercalation Compounds Containing $HclO_4$: Synthesis And Exfoliation, Mol. Cryst., vol. 245, pp. 213-218, (1994).
Herold et al., Exfoliation Of Graphite Intercalation Compounds: Classification And Discussion Of The Process From New Experimental Data Relative To Graphite-Acid Compounds, Materials Science Forum, vol. 152-5, pp. 281-288, (1994).
Fischer et al., Characterization of Graphite powder: The Influence Of Purity, Structure And Texture On Electrical Resistivity, Manganese Dioxide Symp., pp. 711-717, (1981).
May et al., Fine Grinding of Artificial Graphite, Proceedings of the Fourth Conference on Carbon Buffalo, pp. 741-750, (1960).
Chung, Review: Exfoliation of Graphite, J. Material Science, vol. 22, No. 12, 4190-4198, (Dec. 1987).
European Carbon Conference: Carbon '96, vol. 1, (Jul. 1996), pp. 48-49, 60-61, 112-113, 114-115, 274-275, and 346-351.

* cited by examiner

Figur 1
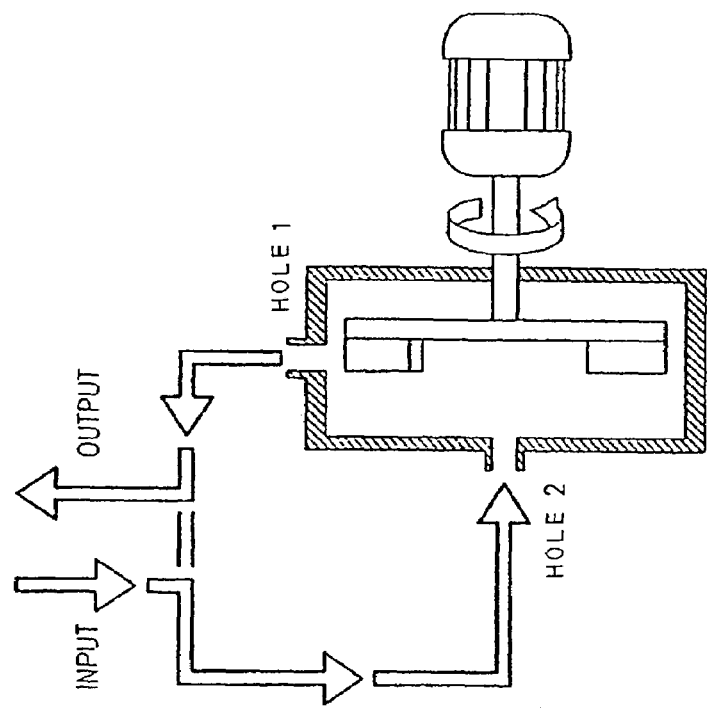
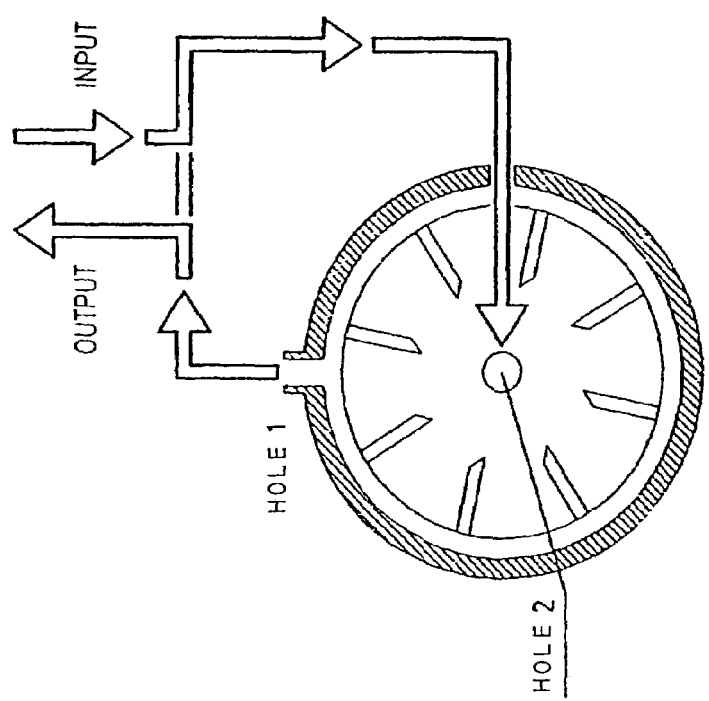

METHOD FOR PRODUCING GRAPHITE POWDER WITH AN INCREASED BULK DENSITY

The present invention relates to a process for the production of graphite powders of increased bulk density. The present invention relates in particular to an autogenous surface treatment of any pulverulent graphitic materials, their bulk density and tamped density being markedly increased and other important material properties being advantageously modified as a result of the mutual physical-mechanical action of the individual powder particles.

Graphitic materials, especially those with a high graphite content, are known per se and are used in industry in a variety of ways. High-purity graphitic carbons have xylene densities (also called single-crystal densities or real densities) ranging from 1.80 to 2.27 g·cm$^{-3}$ and a crystal structure which can be characterized by a c/2 value of 0.3354 to 0.3360 nm and an $L_c$ value of more than 40 nm ($L_c$>40 nm). These materials are obtained from natural sources, enriched and purified or produced synthetically from amorphous carbon products in a high temperature process. Subsequent grinding processes produce pulverulent materials with different mean particle sizes in each case. A given particle size for a powder is normally always a mean value of a specific particle size distribution. The particle size distribution to be used for a particular purpose depends especially on the composition of the graphitic material and the associated properties, as well as on the intended use.

The particle shape is always platelet-like, the anisotropy of the particles being the more pronounced the higher the xylene density and $L_c$ values. The Scott density (also referred to as bulk density) of such materials, for example with particle sizes smaller than 100 micron (particle size<100 μm, determined by laser diffraction analysis), is normally below 0.25 g·cm$^{-3}$, the Scott density being the lower the smaller the particle size. Comminution of the particles by grinding generally results in a lowering of the Scott density. The Scott density can be somewhat increased by an optimized particle size distribution. Thus, for example, Scott densities up to max. 0.3 g·cm$^{-3}$ are achieved by an optimized composition of fine and coarse fractions for such materials with particle sizes below 100 micron.

The tamped density, the compressibility and the absorption capacity for polymeric binder materials and liquids such as oils, and for organic solvents and aqueous systems, are equally important properties of graphite powders. These properties correlate with the composition of the graphite powders and especially with the particle size distribution.

It has now been found that, surprisingly, the values of the Scott density for a particular graphite powder of any particle size distribution is considerably increased when the graphite powder is subjected to an autogenous surface treatment in which the particles impact with one another at an appropriate speed and for a sufficient length of time. The impacts and the associated mutual physical-mechanical action change the structure or surface of the graphite particle in such a way as to result in a considerable increase in the Scott density. The other properties mentioned above are also modified to a considerable extent.

Under the electron microscope, the crude, ground, platelet-like graphite particle has an irregular shape and sharp edges. The irregular particle contours are abraded and the edges rounded off by the treatment according to the invention. If the energy dose is appropriately optimized, the grinding effect which occurs with other mechanical treatments, leading to a noticeable lowering of the bulk density, is considerably reduced or minimized. Although the abrasion of the particles creates dust, which, together with a minimal grinding effect, leads to a slight reduction in particle size and Scott density (bulk density), this particle size effect is far outweighed by the surprisingly large total increase in Scott density, and the change in the other properties, caused by the treatment according to the invention. The present invention can be at least partly explained by the observed changes in the particle contours, but the invention is not bound to this explanation.

The present invention is defined in the Claims. In particular, the present invention relates to a process for increasing the Scott density of graphite powders of any particle size distribution, characterized in that the graphite powder is subjected to an autogenous surface treatment.

The process of autogenous surface treatment consists in allowing the individual powder particles to impact with one another at a measured speed so that, as a result of the associated mutual physical-mechanical action of the individual particles, their surface structure changes but the individual particle remains substantially unbroken, i.e. no substantial grinding effect occurs. This change in the particle contour or surface structure of the individual particle gives rise to the increase in Scott density according to the invention. The autogenous surface treatment is carried out, and the individual particles are allowed to act on one another, until the desired Scott density is achieved. The measured speed means that the speed or energy with which the individual particles are charged is adjusted so that the particles do not disintegrate on impact or collision, thereby practically avoiding a grinding effect. This adjustment is a question of process optimization and does not present a problem to those skilled in the art.

The Scott density achievable by means of the optimized grinding effect for a graphite powder of any particle size distribution can be increased in each case by at least about 10% to about 100%, preferably by about 20% to 80%, by the autogenous surface treatment according to the invention. Hitherto unattained Scott densities of 0.45 g/cm$^3$ or more are thus achieved for graphitic materials.

The tamped density achievable by means of the optimized grinding effect for a graphite powder of any particle size distribution can also be increased by at least about 10% to 100%, preferably by about 20% to 80%, by the process according to the invention. Hitherto unattained tamped densities of at least 0.90 g/cm$^3$ are thus achieved for graphite powders.

In the case of particle sizes of <100 μm, the autogenous surface treatment according to the invention is preferably carried out by fluidizing or dispersing the graphite powder particles in an inert carrier gas and accelerating the particles with the aid of the carrier gas, as described below. The intensity of this treatment is determined by the carbon type and the mass of the particles, their speed and the amount of material used per treatment, i.e. the concentration of the fluidized particles dispersed in the gas. The intensity of the treatment increases with the softness of the graphitic carbon used, the mass of the particles, their speed and the amount used. For particle sizes of <300 μm, the dispersion and acceleration of the particles are preferably effected by means of rotating mechanical tools, for example in the present process by means of a turbine or directly by means of a rotating disk.

However, the grinding effect which occurs also increases simultaneously with increasing intensity of the treatment. Thus, to achieve the maximum bulk density of a material, there is a maximum intensity which results from the optimized parameters of particle speed, particle mass and amount used. The formation of agglomerates due to the agglutination of smaller particles, which would also lead to a sustained increase in the Scott density, has not been observed. Treated particles larger than the untreated particles used did not appear in any of the experiments performed. Analyses of the treated materials by scanning electron microscopy also showed no such agglomeration.

The treatment according to the invention not only increases the Scott density but also improves the compressibility properties of the graphite powders and reduces their absorption capacity for polymeric binder materials and liquids such as oils, organic solvents and aqueous systems. The crystallinity of the graphitic carbon particles, on the other hand, remains unaffected by the mechanical surface treatment. The structural parameters and the xylene density also remain unchanged compared with the untreated particles.

The process according to the invention also increases the pressed density achievable by the optimized grinding effect for a graphite powder of any particle size distribution by at least about 0.5% to 10%, preferably by about 1% to 8%. If the powders treated according to the invention are used to produce mouldings by compression under a pressure of 2.5 to/cm$^2$, markedly higher pressed densities can be achieved compared with the untreated materials.

Furthermore, the powders treated according to the invention exhibit a markedly reduced oil absorption capacity and binder uptake ranging from about 10% to 50% and especially from an average of about 20% to 45%, values in excess of 50% also being obtainable. This effect is achieved by the treatment according to the invention because the porosity (pore structure) of the particles is not affected by the treatment, as can be demonstrated by the fact that the nitrogen adsorption properties and xylene densities hardly change.

Said markedly reduced absorption properties also result in markedly lower viscosities of dispersions of the graphite powders treated according to the invention in liquid media, so dispersions with a correspondingly increased solids content can be prepared with the graphite powders treated according to the invention. The solids content of liquid carbon dispersions can be increased by more than 5% to over 30% by using graphite powders treated according to the invention.

Graphite powders suitable for the use according to the invention are especially those with a high graphite content in the particle, and particularly so-called high-purity graphites, preferably with xylene densities ranging from 1.80 to 2.27 g·cm$^{-3}$ and a crystal structure characterized by a c/2 value of 0.3354 to 0.3360 nm and an $L_c$ value of more than 40 nm ($L_c$>40 nm). The powders can be obtained from natural sources or prepared synthetically from amorphous carbon products and can have any mean particle size and particle size distribution. Preferred pulverulent graphitic materials are those with a mean particle size of up to 150 μm, preferably of 1 μm to 50 μm, and especially high-purity pulverulent graphites. Such graphites are known per se.

The process according to the invention is preferably carried out in such a way that the graphite powder particles to be treated are dispersed and fluidized in a gas. This can be done using any method of fluidization technology known per se in which the particles impact with one another in the fluidized state and thereby change their surface contours and surface structures, as is the case e.g. in a fluidized bed. However, to carry out the process according to the invention, the fluidized particles are preferably provided with higher speeds so that the particles fluidized in this way are accelerated with higher energies. Preferably, the fluidized particles are continuously concentrated and diluted again in the gaseous environment. The resulting collisions between the particles set in rotation, and the friction between them, result in surface abrasion of the particles, the energy transferred to the particles being adjusted so that the collisions and friction cause substantially no disintegration of the particles.

The process according to the invention can be put into optimum effect e.g. in the device shown in FIG. 1. This device consists specifically of a circular disk with radial impact pins flush-mounted on the rim, said disk being sheathed by a cylindrical treatment chamber closed to the outside (turbine with associated turbine effect). The dimensions of the cylindrical treatment chamber are adjusted so that it encloses the disk and can allow some space between its inner wall and the rotating disk. The disk is connected to a motor, located outside the treatment chamber, by means of a shaft through the wall of the treatment chamber and can be set in rotation by this motor. The cylindrical treatment chamber is provided with a radial aperture (hole). An additional aperture is provided in the cylinder jacket of the treatment chamber, perpendicular to the disk and disk axis. These two apertures are connected by a tube located outside the treatment chamber. Thus a tube running outside the treatment chamber and attached to the wall of the treatment chamber connects the periphery of the treatment chamber to its centre. The gas (fluid) containing the fluidized particles, accelerated centrifugally by the rotating disk, circulates through this external treatment tube, exiting through the tube at the periphery of the treatment chamber as a result of the centrifugal force and flowing back through the other end of this tube into the centre of the treatment chamber, where it is accelerated again. The particles of material are accelerated by the impact pins of the rotating disk and driven away in a peripheral direction by the centrifugal forces produced by the high-speed rotor. The particles dispersed and accelerated into the gas in this way circulate in the machine along the inside of the cylinder jacket. The particles reaching the inlet of the circulation tube enter the tube and return to the treatment chamber in the region of the centre of the machine. This results in a continuous concentration and dilution of the particles in the surrounding gaseous medium. A fraction of the treated particles is continuously fed into or withdrawn from an attached tube, but the process can also be carried out as a batch process.

The graphite powders treated according to the invention can advantageously be used as pigments in aqueous or solvent-based dispersions, thereby achieving higher solids contents than with untreated powders. The viscosity of liquid dispersions of materials treated according to the invention is markedly lower for the same solids content. Also, when dispersions according to the invention are applied to substrates and dried, coatings with markedly lower porosity values are obtained because the content of liquid phase is markedly lower. The higher solids content also means that smaller binder/carbon ratios are needed to stabilize a dried carbon coating on a substrate. The low polymeric binder contents result in a marked increase in the electrical and thermal conductivities of such carbon layers.

Dispersions containing mixtures of synthetic and/or natural graphitic carbons treated according to the invention and a polymeric binder in an aqueous or solvent-based medium can be applied to metal foils and dried to give stable coatings (for thicknesses of 10 to 5000 μm) with an increased graphite/binder ratio and hence also increased electrical and thermal conductivities. The porosities of the dried films are normally below 50% and are thus appreciably lower than those of films formed of conventional graphites. Such dispersions can therefore advantageously also be used for gas-tight and liquid-tight coatings on metal substrates, which can be used as electrically conducting anticorrosive films on metal foils and plates.

The dried coatings formed by the graphites treated according to the invention can be compressed by a calender without the graphite film delaminating from the metal foil. This delamination from the metal foil is frequently observed with untreated graphites. The calendering of graphite films produced from graphite powders treated according to the invention affords coatings with porosities below 30% without altering the texture or particle structure of the graphite powders used. Such film coatings on metal foils, characterized by porosities below 30% and stabilized with lower binder/carbon ratios, can be used in lithium ion batteries as negative electrodes with charge densities above 550 Ah/l. The current-carrying capacity of such electrodes is markedly higher than that of electrodes made of conventional graphite powders. Such negative electrodes can thus be used very advantageously for lithium ion cells with a high power density.

The high packing density of the synthetic or natural graphites treated according to the invention, combined with the relatively low polymeric binder absorption capacity, is advantageous in the production of graphite/polymer composites which can be compressed to gas-tight graphite plates of high electrical conductivity. Such plates are advantageously used as bipolar plates in polymer electrolyte fuel cell technology.

Mixtures of polymers with synthetic or natural graphites or graphitic carbons treated according to the invention form thermoplastic or thermosetting composites with a higher proportion of carbon filler and a lower processing viscosity. Thermoplastic polymer/graphite composite materials with graphites treated according to the invention have higher (and hence improved) values in respect of their isotropic, mechanical, thermal and electrical properties and behave more isotropically than composites with untreated graphitic carbons.

Metallic non-ferrous sintered materials which have been produced with synthetic or natural graphitic carbons treated according to the invention, or contain such carbons, have improved isotropic, mechanical and tribological properties.

The Examples which follow describe the invention.

Examples 1 to 5 show the material properties of various graphites before and after the autogenous surface treatment according to the invention. The experiments were performed in the device described in the above section. The rotating disk used had a periphery of 0.75 m and a speed of rotation of 800 rpm.

Examples 1–5 were carried out under the experimental conditions given in Table 1.

TABLE 1

| Example | Type of graphite | Amount used | Treatment time | Speed of rotating disk |
|---|---|---|---|---|
| 1 | TIMREX ® KS-graphite | 150 g | 5 min | 4800 rpm |
| 2 | TIMREX ® SLX-graphite | 150 g | 5 min | 4200 rpm |
| 3 | TIMREX ® SLM-graphite | 150 g | 5 min | 4800 rpm |
| 4 | TIMREX ® SFG-graphite | 200 g | 5 min | 4800 rpm |

TABLE 1-continued

| Example | Type of graphite | Amount used | Treatment time | Speed of rotating disk |
|---|---|---|---|---|
| 5 | TIMREX ® NP-graphite | 200 g | 7 min | 4800 rpm |
| 6 | TIMREX ® KS 5-75 TT | 200 g | 5 min | 4800 rpm |

TIMREX ® KS-graphite = TIMREX ® KS 5-25 from TIMCAL AG
TIMREX ® SLX-graphite = TIMREX ® SLX 50 from TIMCAL AG
TIMREX ® SLM-graphite = TIMREX ® SLM 44 from TIMCAL AG
TIMREX ® SFG-graphite = TIMREX ® SFG 44 from TIMCAL AG
TIMREX ® NP-graphite = TIMREX ® NP 44 from TIMCAL AG Examples 1 to 5 show a marked increase in Scott density (bulk density) and tamped density for the powders treated according to the invention. The treated powders exhibited no agglomerates whatsoever. The resulting change in particle size distribution is indicative of a small grinding effect. The slight lowering of d values, however, is caused especially by the dust produced by the abrasion of the particles. The pore structure of the treated particles is not affected by the surface treatment. It is assumed that the dust produced by the treatment and the slight decrease in particle size distribution are the main reason for the slight lowering of the $L_c$ values and the xylene densities. The elastic recovery of the compressed treated materials drops sharply. The pressed density of mouldings produced from the treated materials under a pressure of 2.5 to/cm$^2$ increases sharply. Although the BET values are increased somewhat, the oil absorption and binder absorption of the particles treated according to the invention decrease markedly. Dispersions of treated carbon particles in liquid media exhibit markedly lower viscosities than dispersions of untreated carbon particles. The solids content of liquid carbon dispersions can be increased by more than 5% by using carbon particles according to the invention. The electrical resistance of the carbons treated according to the invention decreases. The changes in surface contours of the individual particles which result from the treatment of powders according to the invention can be clearly seen from scanning electron micrographs.

Experimental Section

The particle size distribution of the materials was determined by laser diffraction analysis using a MALVERN Mastersizer. The structural parameters were obtained from X-ray diffraction experiments based on the CuK$_{\alpha 1}$ line. The crystallographic cell constant in the c direction (c/2) was determined from the relative position of the (002) or (004) diffraction reflex. The maximum height of the single-crystal domains in a particle in the crystallographic c direction, $L_c$, and the resulting number of ideally stacked graphite planes were obtained from the (002) or (004) diffraction reflex according to the model of Scherrer and Jones (P. Scherrer, Göttinger Nachrichten 2 (1918) p. 98; F. W. Jones, Proc. Roy. Soc. (London) 166 A (1938) p. 16). The xylene density was determined according to DIN 51 901. Determination of the Scott density was based on ASTM B 329. The tamped density was determined according to AKK-19. The specific surface areas were determined by the method of Brunauer, Emmett and Teller using a Micromeritics ASAP 2010. To determine the elastic recovery, the material was placed under a pressure of 0.5 to/cm$^2$. The recovery was obtained from the height of the moulding with and without applied pressure and is given in percent. The electrical resistance was measured according to DIN 51 911 using a moulding produced under a pressure of 2.5 to/cm$^2$. The pressed density of this moulding is also given. The oil absorption was measured on the basis of DIN ISO 787 with initial weights of 0.5 g of material and 1.5 g of oil. The mixture was centrifuged in a Sigma 6–10 centrifuge for 90 min at a speed of 1500 rpm.

EXAMPLE 1

| TIMREX ® KS synthetic graphite Untreated | TIMREX ® KS synthetic graphite After treatment |
|---|---|
| Particle size | Particle size |
| $d_{10}$ = 7.0 micron | $d_{10}$ = 5.9 micron |
| $d_{50}$ = 15.2 micron | $d_{50}$ = 13.5 micron |
| $d_{90}$ = 30.2 micron | $d_{90}$ = 27.4 micron |
| $L_c(002)/L_c(004)$ | $L_c(002)/L_c(004)$ |
| 120 nm/68 nm | 101 nm/64 nm |
| c/2 (002)/c/2 (004) | c/2 (002)/c/2 (004) |
| 0.3355 nm/0.3355 nm | 0.3355 nm/0.3355 nm |
| Xylene density | Xylene density |
| 2.254 g · cm$^{-3}$ | 2.248 g · cm$^{-3}$ |
| Scott density | Scott density |
| 0.23 g · cm$^{-3}$ | 0.30 g · cm$^{-3}$ |
| Tamped density | Tamped density |
| 0.539 g · cm$^{-3}$ | 0.674 g · cm$^{-3}$ |
| BET specific surface area | BET specific surface area |
| 8.6 m$^2$ · g$^{-1}$ | 9.3 m$^2$ · g$^{-1}$ |
| Elastic recovery | Elastic recovery |
| 17% | 12.3% |
| Electrical resistance | Electrical resistance |
| 1.911 mΩ · cm | 2.085 mΩ · cm |
| Oil absorption | Oil absorption |
| 113.5% ± 1.3% | 64.3% ± 0.2% |
| Pressed density (2.5 to/cm$^2$) | Pressed density (2.5 to/cm$^2$) |
| 1.863 g · cm$^{-3}$ | 1.957 g · cm$^{-3}$ |

EXAMPLE 2

| TIMREX ® SLX synthetic graphite Untreated | TIMREX ® SLX synthetic graphite After treatment |
|---|---|
| Particle size | Particle size |
| $d_{10}$ = 11.6 micron | $d_{10}$ = 7.4 micron |
| $d_{50}$ = 27.3 micron | $d_{50}$ = 20.4 micron |
| $d_{90}$ = 52.5 micron | $9_{90}$ = 40.8 micron |
| $L_c(002)/L_c(004)$ | $L_c(002)/L_c(004)$ |
| >500 nm/232 nm | 368 nm/158 nm |
| c/2 (002)/c/2 (004) | c/2 (002)/c/2 (004) |
| 0.3354 nm/0.3354 nm | 0.3354 nm/0.3354 nm |
| Xylene density | Xylene density |
| 2.261 g · cm$^{-3}$ | 2.258 g · cm$^{-3}$ |
| Scott density | Scott density |
| 0.30 g · cm$^{-3}$ | 0.38 g · cm$^{-3}$ |
| Tamped density | Tamped density |
| 0.641 g · cm$^{-3}$ | 0.778 g · cm$^{-3}$ |
| BET specific surface area | BET specific surface area |
| 4.0 m$^2$ · g$^{-1}$ | 5.9 m$^2$ · g$^{-1}$ |
| Elastic recovery | Elastic recovery |
| 7.7% | 4.6% |
| Electrical resistance | Electrical resistance |
| 0.986 mΩ · cm | 1.166 mΩ · cm |
| Oil absorption | Oil absorption |
| 94.7% ± 11.9% | 73.3% ± 6.4% |
| Pressed density (2.5 to/cm$^2$) | Pressed density (2.5 to/cm$^2$) |
| 2.036 g · cm$^{-3}$ | 2.051 g · cm$^{-3}$ |

EXAMPLE 3

| TIMREX ® SLM synthetic graphite Untreated | TIMREX ® SLM synthetic graphite After treatment |
|---|---|
| Particle size | Particle size |
| $d_{10}$ = 7.3 micron | $d_{10}$ = 4.3 micron |
| $d_{50}$ = 23.2 micron | $d_{50}$ = 13.9 micron |
| $d_{90}$ = 49.4 micron | $d_{90}$ = 35.0 micron |
| $L_c(002)/L_c(004)$ | $L_c(002)/L_c(004)$ |
| 241 nm/139 nm | 196 nm/116 nm |
| c/2 (002)/c/2 (004) | c/2 (002)/c/2 (004) |
| 0.3354 nm/0.3354 nm | 0.3354 nm/0.3354 nm |
| Xylene density | Xylene density |
| 2.254 g · cm$^{-3}$ | 2.252 g · cm$^{-3}$ |
| Scott density | Scott density |
| 0.19 g · cm$^{-3}$ | 0.34 g · cm$^{-3}$ |
| Tamped density | Tamped density |
| 0.408 g · cm$^{-3}$ | 0.738 g · cm$^{-3}$ |
| BET specific surface area | BET specific surface area |
| 4.9 m$^2$ · g$^{-1}$ | 7.7 m$^2$ · g$^{-1}$ |
| Elastic recovery | Elastic recovery |
| 14.0% | 8.6% |
| Electrical resistance | Electrical resistance |
| 1.278 mΩ · cm | 1.741 mΩ · cm |
| Oil absorption | Oil absorption |
| 109.5% ± 2.7% | 75.0% ± 5.3% |
| Pressed density (2.5 to/cm$^2$) | Pressed density (2.5 to/cm$^2$) |
| 1.930 g · cm$^{-3}$ | 2.036 g · cm$^{-3}$ |

EXAMPLE 4

| TIMREX ® SFG synthetic graphite Untreated | TIMREX ® SFG synthetic graphite After treatment |
|---|---|
| Particle size | Particle size |
| $d_{10}$ = 7.5 micron | $d_{10}$ = 4.4 micron |
| $d_{50}$ = 24.1 micron | $d_{50}$ = 15.0 micron |
| $d_{90}$ = 49.2 micron | $d_{90}$ = 35.5 micron |
| $L_c(002)/L_c(004)$ | $L_c(002)/L_c(004)$ |
| 320 nm/138 nm | 283 nm/199 nm |
| c/2 (002)/c/2 (004) | c/2 (002)/c/2 (004) |
| 0.3354 nm/0.3354 nm | 0.3354 nm/0.3354 nm |
| Xylene density | Xylene density |
| 2.262 g · cm$^{-3}$ | 2.258 g · cm$^{-3}$ |
| Scott density | Scott density |
| 0.20 g · cm$^{-3}$ | 0.36 g · cm$^{-3}$ |
| Tamped density | Tamped density |
| 0.420 g · cm$^{-3}$ | 0.766 g · cm$^{-3}$ |
| BET specific surface area | BET specific surface area |
| 5.9 m$^2$ · g$^{-1}$ | 7.4 m$^2$ · g$^{-1}$ |
| Elastic recovery | Elastic recovery |
| 9.2% | 5.6% |
| Electrical resistance | Electrical resistance |
| 0.925 mΩ · cm | 0.986 mΩ · cm |
| Oil absorption | Oil absorption |
| 110.2% ± 6.4% | 81.8% ± 6.9% |
| Pressed density (2.5 to/cm$^2$) | Pressed density (2.5 to/cm$^2$) |
| 2.005 g · cm$^{-3}$ | 2.036 g · cm$^{-3}$ |

EXAMPLE 5

| TIMREX ® NP purified natural graphite Untreated | TIMREX ® NP purified natural graphite After treatment |
|---|---|
| Particle size | Particle size |
| $d_{10}$ = 6.6 micron | $d_{10}$ = 3.7 micron |
| $d_{50}$ = 23.0 micron | $d_{50}$ = 13.8 micron |
| $d_{90}$ = 49.5 micron | $d_{90}$ = 36.9 micron |
| $L_c(002)/L_c(004)$ | $L_c(002)/L_c(004)$ |
| 364 nm/166 nm | 255 nm/103 nm |
| c/2 (002)/c/2 (004) | c/2 (002)/c/2 (004) |
| 0.3354 nm/0.3354 nm | 0.3354 nm/0.3354 nm |
| Xylene density | Xylene density |
| 2.263 g · cm$^{-3}$ | 2.258 g · cm$^{-3}$ |
| Scott density | Scott density |
| 0.24 g · cm$^{-3}$ | 0.42 g · cm$^{-3}$ |
| Tamped density | Tamped density |
| 0.495 g · cm$^{-3}$ | 0.862 g · cm$^{-3}$ |
| BET specific surface area | BET specific surface area |
| 5.0 m$^2$ · g$^{-1}$ | 7.9 m$^2$ · g$^{-1}$ |
| Elastic recovery | Elastic recovery |
| 4.9% | 3.8% |
| Electrical resistance | Electrical resistance |
| 0.910 mΩ · cm | 1.359 mΩ · cm |
| Oil absorption | Oil absorption |
| 107.2% ± 3.6% | 58.9% ± 0.6% |
| Pressed density (2.5 to/cm$^2$) | Pressed density (2.5 to/cm$^2$) |
| 2.066 g · cm$^{-3}$ | 2.064 g · cm$^{-3}$ |

EXAMPLE 6

| TIMREX ® KS purified natural graphite Untreated | TIMREX ® KS purified natural graphite After treatment |
|---|---|
| Particle size | Particle size |
| $d_{10}$ = 8.3 micron | $d_{10}$ = 3.1 micron |
| $d_{50}$ = 38.4 micron | $d_{50}$ = 38.4 micron |
| $d_{90}$ = 68.4 micron | $d_{90}$ = 68.4 micron |
| $L_c(002)/L_c(004)$ | $L_c(002)/L_c(004)$ |
| 142 nm/62 nm | 105 nm/52 nm |
| c/2 (002)/c/2 (004) | c/2 (002)/c/2 (004) |
| 0.3355 nm/0.3355 nm | 0.3356 nm/0.3356 nm |
| Xylene density | Xylene density |
| 2.227 g · cm$^{-3}$ | 2.225 g · cm$^{-3}$ |
| Scott density | Scott density |
| 0.44 g · cm$^{-3}$ | 0.46 g · cm$^{-3}$ |
| Tamped density | Tamped density |
| 0.84 g · cm$^{-3}$ | 0.902 g · cm$^{-3}$ |
| BET specific surface area | BET specific surface area |
| 4.1 m$^2$ · g$^{-1}$ | 8.0 m$^2$ · g$^{-1}$ |
| Elastic recovery | Elastic recovery |
| 25% | 14.68% |
| Electrical resistance | Electrical resistance |
| 2.109 mΩ · cm | 2.311 mΩ · cm |
| Oil absorption | Oil absorption |
| 97.2% ± 1.6% | 54.7% ± 0.8% |
| Pressed density (2.5 to/cm$^2$) | Pressed density (2.5 to/cm$^2$) |
| 1.912 g · cm$^{-3}$ | 1.972 g · cm$^{-3}$ |

What is claimed is:

1. A process for increasing the Scott density of a starting graphite powder of any particle size distribution, the starting graphite powder being a synthetic and/or natural graphitic carbon which has a high graphite content in the particle, comprising subjecting the starting graphite powder to an autogenous surface treatment in which individual graphite powder particles are allowed to impact with one another at a measured speed so that their surface structure changes while substantially retaining graphite particle shape without a substantial grinding effect occurring and wherein said autogenous surface treatment is carried out until the Scott density and/or the tamped density of the starting powder has increased by at least about 10% to about 100%.

2. The process according to claim 1, wherein the graphite powder is high-purity graphite.

3. The process according to claim 2, wherein the graphite powder has a xylene density ranging from 1.80 to 2.27 g·cm$^{-3}$, a crystal structure characterized by a c/2 value of 0.3354 to 0.3360 nm, and an $L_c$ value of more than 40 nm ($L_c$>40 nm).

4. The process according to claim 3, wherein the graphite powder has a particle size of up to 150 μm.

5. The process according to claim 4, wherein the graphite powder has a particle size of 1 μm to 50 μm.

6. The process according to claim 4, wherein the autogenous surface treatment is carried out until the Scott density and/or the tamped density of the starting graphite powder has increased by about 20 percent to 80 percent.

7. The process according to claim 4, wherein the autogenous surface treatment is carried out by fluidizing or dispersing graphite powder particles with sizes of <100 μm in an inert carrier gas with the aid of the carrier gas.

8. The process according to claim 4, wherein the autogenous surface treatment is carried out by dispersing graphite powder particles with sizes of <300 μm by means of a rotating mechanical tool.

9. The process according to claim 8, wherein the rotating mechanical tool is a turbine.

10. The process according to claim 1, wherein the graphite powder has a xylene density ranging from 1.80 to 2.27 g·cm$^{-3}$, a crystal structure characterized by a c/2 value of 0.3354 to 0.3360 nm, and an $L_c$ value of more than 40 nm ($L_c$>40 nm).

11. The process according to claim 1, wherein the graphite powder has a particle size of up to 150 μm.

12. The process according to claim 11, wherein the graphite powder has a particle size of 1 μm to 50 μm.

13. The process according to claim 1, wherein the autogenous surface treatment is carried out until the Scott density and/or the tamped density of the starting graphite powder has increased by about 20 percent to 80 percent.

14. The process according to claim 13, wherein the autogenous surface treatment is carried out by fluidizing or dispersing graphite powder particles with sizes of <100 μm in an inert carrier gas with the aid of the carrier gas.

15. The process according to claim 13, wherein the autogenous surface treatment is carried out by dispersing graphite powder particles with sizes of <300 μm by means of a rotating mechanical tool.

16. The process according to claim 15, wherein the rotating mechanical tool is a turbine.

17. A process comprising preparing a dispersion of the graphite powder produced according to claim 1, in a liquid media, the dispersion having an increased solids content.

18. The liquid dispersion prepared according to the process of claim 17.

19. A process comprising preparing a dispersion of the graphite powder produced according to claim 15, in a liquid media, the dispersion having an increased solids content.

20. The liquid dispersion prepared according to the process of claim 19.

21. A process comprising preparing an aqueous or solvent-based dispersion containing the graphite powder produced according to claim 1, as a pigment.

22. The aqueous or solvent-based dispersion prepared according to the process of claim 21.

23. A process comprising preparing an aqueous or solvent-based dispersion containing the graphite powder produced according to claim 15, as a pigment.

24. The aqueous or solvent-based dispersion prepared according to the process of claim 23.

25. A process comprising applying a dispersion of a mixture of a graphitic carbon produced according to the process of claim 1, with a polymeric binder in an aqueous or solvent-based medium to a metal foil or plate.

26. The metal foil or plate with the applied dispersion prepared according to the process of claim 25.

27. A process comprising coating a dispersion of a mixture of a graphitic carbon produced according to the process of claim 1, with a polymeric binder in an aqueous or solvent-based medium on a substrate to provide a coating with an increased graphite/binder ratio and increased electrical and thermal conductivities.

28. The coated substrate prepared according to the process of claim 27.

29. The process according to claim 27 wherein the dispersion is coated on a metallic substrate to provide a gas-tight and liquid-tight coating on the metallic substrate.

30. The coated metallic substrate prepared according to the process of claim 27.

31. The coated metallic substrate according to claim 30, which is a negative electrode for a lithium ion battery.

32. A lithium ion battery containing the negative electrode of claim 31.

33. A process comprising preparing a thermoplastic or thermosetting graphite/polymer composite from a thermoplastic or thermosetting polymer and the graphite powder according to the process of claim 1.

34. The composite prepared according to the process of claim 33.

35. A process comprising compressing the composite prepared by the process of claim 34, to provide a graphite plate of high electrical conductivity.

36. The composite prepared according to the process of claim 35, having such graphite of high electrical conductivity.

37. The composite prepared according to the process of claim 36, having such graphite of high electrical conductivity, which is a bipolar plate for a polymer electrolyte fuel cell technology.

38. A polymer electrolyte fuel cell containing the bipolar plate of claim 37.

39. A process comprising sintering a metallic non-ferrous material containing the graphite powder produced according to claim 1.

40. The metallic non-ferrous sintered material prepared according to the process of claim 39.

* * * * *